United States Patent [19]

Hamada et al.

[11] Patent Number: 5,056,912
[45] Date of Patent: Oct. 15, 1991

[54] PROJECTION TYPE IMAGE DISPLAY APPARATUS

[75] Inventors: Hiroshi Hamada, Nara; Fumiaki Funada, Yamatokoriyama, both of Japan

[73] Assignee: Sharp Kabushiki Kaisha, Japan

[21] Appl. No.: 553,084

[22] Filed: Jul. 17, 1990

[30] Foreign Application Priority Data

Jul. 19, 1989 [JP] Japan .................................. 1-187714

[51] Int. Cl.$^5$ ............................................ G03B 21/14
[52] U.S. Cl. ...................................... 353/38; 358/231; 359/456; 359/64
[58] Field of Search .................... 353/38, 102, 122, 31; 350/127, 128, 330, 331 R; 358/231, 230

[56] References Cited

U.S. PATENT DOCUMENTS

| | | | |
|---|---|---|---|
| 3,840,695 | 10/1984 | Fischer | 358/150 |
| 3,877,801 | 4/1975 | MacGovern | 350/167 |
| 4,082,438 | 4/1978 | Knop | 353/38 |
| 4,428,647 | 1/1984 | Sprague et al. | 350/167 |
| 4,497,015 | 1/1985 | Konno et al. | 353/38 |
| 4,936,657 | 6/1990 | Tejima et al. | 353/102 |
| 4,969,732 | 11/1990 | Wright et al. | 353/122 |

FOREIGN PATENT DOCUMENTS

| | | |
|---|---|---|
| 49-74438 | 7/1974 | Japan . |
| 54-18886 | 2/1979 | Japan . |
| 60-179723 | 9/1985 | Japan . |
| 60-262131 | 12/1985 | Japan . |

Primary Examiner—Allan N. Shoap
Assistant Examiner—William C. Dowling
Attorney, Agent, or Firm—Nixon & Vanderhye

[57] ABSTRACT

A projection type image display apparatus having a source of light, a transmissive display device having a number of picture elements, a light converging means for converging rays of light in correspondence to one or more of the picture elements, a projecting lens disposed backward of the display device so as to project the image represented by the display device on a screen, the projection lens having a larger numerical aperture than that of the converging means.

2 Claims, 4 Drawing Sheets

PROJECTION TYPE IMAGE DISPLAY APPARATUS

BACKGROUND OF THE INVENTION

1. Field of the Invention:

The present invention relates generally to a display apparatus, and more particularly to a projection type display apparatus for displaying a projected color image through lenses from permissive display devices such as liquid crystal display devices wherein the color image is composed of multiple picture elements arranged in a matrix. This type of display apparatus is particularly applicable to a large-screen projection TV (television), information display systems and the like.

2. Description of the Prior Art:

The display devices used in the present invention do not emit light, but their transmissibility varies in response to a driving signal so as to display images and/or characters by modulating the intensity of an incident light. Examples of such display devices include liquid crystal displays, electrochromic displays, display units using transparent ceramics such as PLZT, among which the liquid crystal display devices are most widely used for pocket-sized TV and word processors. By taking the liquid crystal display panels as an example, the background of the present invention will be described:

The commonly called "matrix type liquid crystal display device" contains picture elements arranged in a matrix that are individually driven by driving voltages so as to change the optical characteristics of the liquid crystal so as to make up images and/or characters. The driving voltage can be applied to the individual picture elements by various means, for example, by a simple matrix system or alternatively, by an active matrix system under which a non-linear two-terminal element such as MIM (metal-insulating layer-metal) or three-terminal switching element such as TFT (thin film transistor) is disposed for each picture element. The present invention can be applied to either of these systems, but the greatest effect is achieved when it is applied to the active matrix system.

There are at least two methods by which the transmissive type display devices can be observed; one is to observe the display panel directly, and the other is to observe a projected image enlarged through a lens. The projection type is classified into two categories; one is to use a single liquid crystal display panel equipped with a mosaic color filter of primary colors (i.e. red, green and blue) and the other is to use three liquid crystal display panels each representing a monochrome image. In the latter projection system each display panel is illuminated with lights of primary colors, and makes up images of primary colors by representing a monochromatic image corresponding to color of the illumination. To compose the three images of primary colors, one method is to project the images individually onto a screen and compose them thereon, and the other method is to compose them by use of a dichroic mirror and project the composed image through a common projecting lens.

The above-mentioned single-panel system is disclosed in Japanese Laid-Open Patent Publication (Kokai) No. 49-74438 (allowed Publication No. 54-18886). This prior art discloses that thin film transistor controls picture panels individually, and an image is projected through color liquid crystal display devices equipped with filters of primary colors in mosaic and is observed. The employment of three liquid crystal display devices is disclosed in Japanese Laid-Open Patent Publication No. 60-179723.

The active matrix liquid crystal display (LCD) must employ signal lines among picture elements so as to drive a non-linear two-terminal element such as MIM (metal-insulating layer-metal) or three-terminal switching element such as TFT (thin film transistor) disposed for each picture element. The provision of signal lines requires spaces, but the allowed space is limited in view of the electric performance and manufacturing convenience. If the picture element pitches are excessively minimized, the aperture ratio (the ratio of an effective opening occupied by each picture element or an area for allowing the passage of light to the total area) is reduced. Part of incident rays to areas other than the picture elements is not subjected to modulation by display signals, and this part of the rays does not pass through the display element designed to display only in a "normally black mode" (a mode in which no ray is allowed to pass when no electric field is applied to the liquid crystal layer). When the part of the rays is passed through a display panel designed to display only in a "normally white mode" (a mode in which the rays are allowed to pass when no electric field is applied to the liquid crystal panel), the contrast of the image is reduced because of the increased black level. To avoid poor contrast of image, areas other than the picture elements are masked so as to absorb or reflect rays which do not contribute to the representation of images. In either case, the image is darkened because of the reduced aperture ratio throughout the display element. This defect is the same whether it is the directly observing type or the projection type.

As is the case with most conventional motion picture projectors and slide projectors, the projection type liquid crystal display apparatus use Köhler's illumination. To use this illumination, the optical system is constructed so that an image of the light source through a condenser lens is made up near projecting lens so as to minimize the diameter of the projection lens. If under this optical system a microlens array having a microlens for each picture element is used, the rays entered in the display devices are converged in each picture element area and modulated in response to a display signal, but after passing through the display areas, they diverge at angles depending upon numerical aperture (NA) of the microlens. When this angle is excessively large, a part of the rays passing through the display devices does not enter into the entrance pupil of the projecting lens, thereby resulting in dark images.

The numerical aperture (NA) is expressed by:

$$NA = R/f \qquad (1)$$
$$= 1/2F$$

where R is the radius of the microlens and f is the focal length of the microlens, and F is the F number of microlens.

Japanese Laid-Open Patent Publication (Kokai) No. 60-262131 discloses a pair of microlens arrays disposed at each side of the display device. The first microlens array converges a light entering the display device at a picture element area thereof, and the second microlens array converts the diverging rays at an angle determined by the numeral aperture of microlens array. This display apparatus requires a precise alignment of the display element and a pair of microlens arrays. Furthermore, the light passing through the display device is not exactly converted into a parallel flux owing to a possible aberration of the microlens array. In addition, the increased number of interfaces is likely to cause reflection loss and scattering of light.

SUMMARY OF THE INVENTION

The projection type display apparatus of this invention, which overcomes the above-discussed and numerous other disadvantages and deficiencies of the prior art, comprises a source of light, a transmissive display device having a number of picture elements, a light converging means for converging rays of light in correspondence to one or more of the picture elements, a projecting lens disposed backward of the display element so as to project the image represented by the display devices on a screen, the projection lens having a larger numerical aperture than that of the converging means.

In another embodiment, the converging means comprises a microlens array.

In a further embodiment, the converging means comprises a microlens array and a condenser lens.

According to another aspect of the present invention, the microlens array is bonded to the display element with an adhesive selected from substances having a refractive index approximately within the difference of 0.1 to that of a material of which the microlens array is made.

Thus, the invention described herein makes possible the objectives of providing a projection type display apparatus (1) which is capable of projecting an incident light to the display device effectively with the minimum loss, thereby enhancing the brightness of image, and (2) which is capable of easy and economical production.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
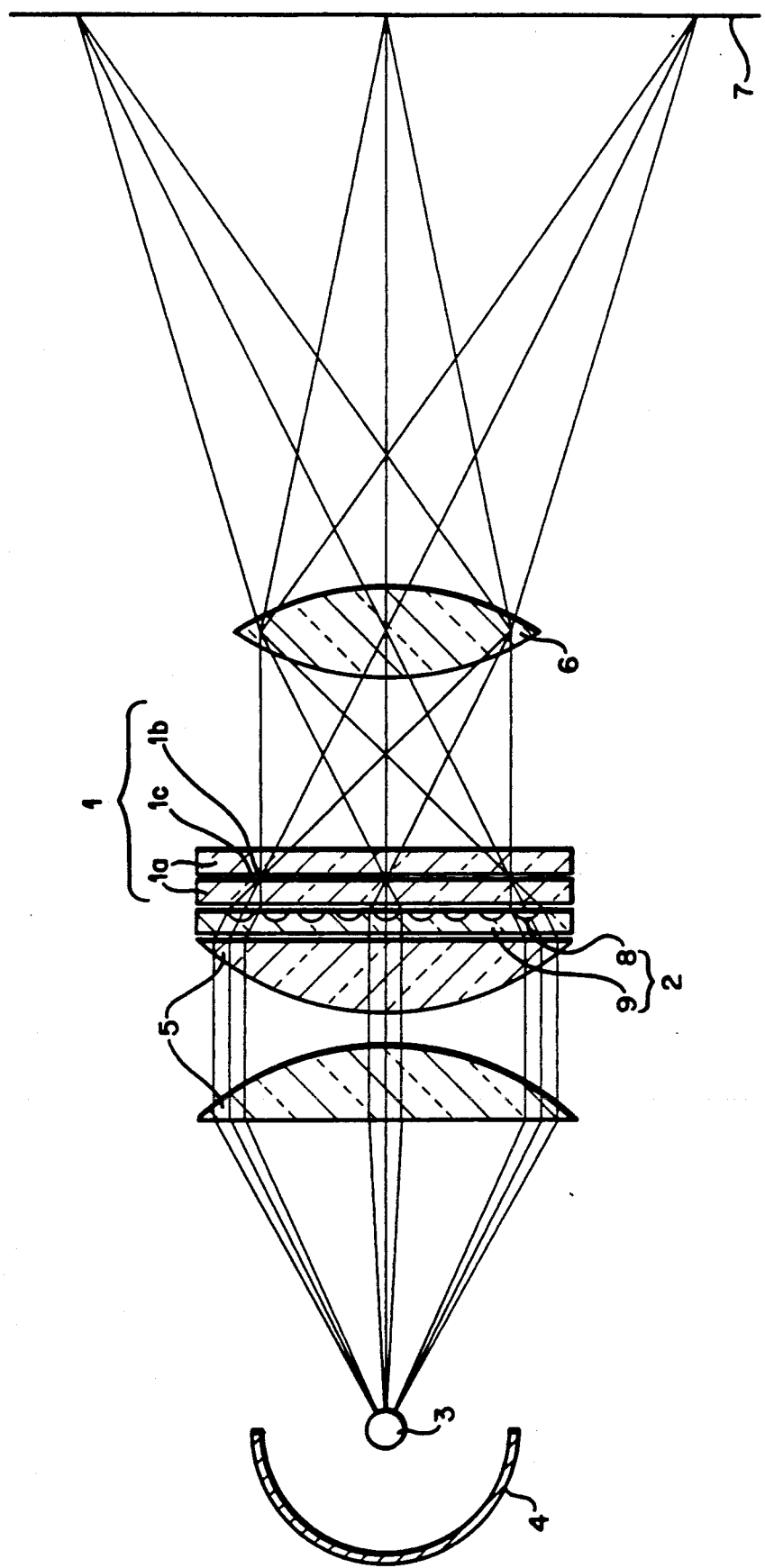
FIG. 1 is a diagrammatic view showing an optical system incorporated in a projection type image display apparatus of a single panel system according to the present invention.

Referring to FIG. 1, there is provided a liquid crystal display panel or device 1 (hereinafter referred to as "display device") having a pair of transparent substrate 1a such as glass sheets with a liquid crystal layer, picture element areas 1b and a light shield area 1c therebetween. The picture element area 1b is composed of pair of transmissive electrodes, and the light shield area 1c contains metallic conductors which transmit electrical signals to the transparent electrode. The area of the display device 1 has a diagonal of 75 mm, a picture element pitch of 190 μm (longitudinal) and 161 μm (lateral). The picture element area 1b has an area of 104 μm (longitudinal) ×88 μm (lateral), having an aperture ratio of 30%. Each substrate 1a has a refractive index n of 1.53, and a thickness of 1.1 mm. The liquid crystal display device is operated in the twisted nematic mode, but other modes of the liquid crystal display may be also utilized. A polarizer can be additionally used. In this case, the polarizer can be bonded to the display device 1 but in anticipation of a rise in temperature under a source of light having a high luminance, the direct attachment of the polarizer to the display device 1 is not recommendable. The polarizer can be located anywhere between the light source and the display device 1 provided that there is no substance which is likely to affect the polarizing characteristic of an incident light to the display device. For example, microlenses can be interposed between the display device and the polarizer.

The reference numeral 2 denotes a microlens array which functions as a convex lens. The microlens array 2 contains a number of microlenses 8 which each function as convex lenses. The microlens array includes compound eye lenses and lenticular lenses, which will be described below. The pitches of the microlenses correspond to those of the picture elements in the display element 1, and each microlens has a diameter of 160 μm, and a focal length equal to the thickness of the substrate 1a (in air, 1.1/1.53=0.72 mm). Accordingly, the numerical aperture NA of the microlens is 80/720=1/9. The microlens array 2 is bonded to the display element 1 with a transparent adhesive in such a manner as to correspond to the picture elements 1b.

For example, a white source of light 3 is provided by a halogen lamp, a metal halide lamp, a xenon lamp and the like.

There is provided a reflector 4 designed to reflect light in an opposite direction to the source of light, a condenser lens 5, a projecting lens 6 and a projection screen 7.

The light from the source 3 is converged so as to advance toward the projecting lens 6 through the reflector 4 and the condenser lens 5. The light flux is converged through the microlens array 2 as shown in FIG. 1, and passes through the picture element area 1b whereby the intensity is modulated in response to the application of a picture element signal voltage. Then the light is projected onto the screen 7 through the projecting lens 6.

In the embodiment shown in FIG. 1 Köhler illumination is used, thereby enabling light passing through the center of the microlenses to advance toward the center of the projecting lens 6.

For the condenser lens 5 a pair of planoconvex lens having a focal length f of 180 mm are used with each convex face facing each other. In FIG. 1, if no microlens array 2 is used, and the source of light 3 is placed toward the light incidence side of the left-hand lens as shown, the image of the light source will be formed at the right-hand focal point.

In FIG. 1, if the display element 1 is placed 10 mm to the right away from the condenser lens 5, the distance between the source of light 3 and the display element 1 will amount to 170 mm. In this situation, if the microlens array 2 is placed at the place shown in FIG. 1, which is substantially equal to the placement of a virtual source of light 170 mm backward (to the right) of the microlens array 2. In this case, the image of the converged light source through the microlens array 2 is formed at a place determined in the following manner:

In the formula of lens, $1/f = 1/a + 1/b$ $a = -170$ mm and $f = 0.72$ mm are placed in the formula, then $b = 1/(1/0.72 + 1/170) = 0.717$ mm.

As is evident from the calculation, the focal length of the condenser lens 5 is much larger than that of the microlenses, so that it is safely considered that the image of the light source through the microlenses is formed at the focal point of the microlenses. The image of light source geometrically shrinks in size (focal length of the microlens array 2/focal length of the condenser lens 5). In this example, the size will be reduced to 0.72/180 (=0.004 times). If the source of light 3 has a luminescent area of 10 mm in diameter, the reduced image of light source will be 40 μm in diameter, which is smaller than the picture element area 1b so as to allow all rays entered in the microlenses to pass therethrough. The rays passing through the picture element area 1b diverge in a conical shape within an angular range of $\tan \theta \leq \pm 1/9$ around rays passing through the center of each microlens, and advance toward the projecting lens 6. The distance L between the display element 1 and the projection lens 6 is given by:

$$L = f_p(1 + 1/m) \quad (2)$$

where $f_p$ is the focal length of the projecting lens 6 and m is the magnification of projection.

If the focal length $f_p$ of the projecting lens 6 is 150 mm, and the magnification m is 5 to 30, L will be in the range between 155 and 180 mm. When L is equal to 180 mm, the rays passing through the display element diverges within a circle having a radius of 20 mm at the entrance pupil of the projection lens 6. If the projection lens 6 has an entrance pupil having a diameter of 40 mm or more, all of the rays passing through the display device 1 can be caught, since the projection lens 6 has a numerical aperture (NA) of 20/150 = 1/7.5, which is larger by 20% than the numerical aperture (NA) of the microlens. It is essential to satisfy the conditions that the numerical aperture (NA) of the projection lens 6 is larger than that of the microlens 2, preferably by 20%. The microlens array 2 contains microlenses 8 which are made by making such a material as to change the refractive index of a substrate 9 diffuse therein selectively through a suitable mask (not shown). Each of the microlenses 8 is semi-spherical, and has a higher refractive index area. As the substances alkaline ions or heavy metal ions can be used when the substrate 9 is glass, and organic molecules having a different molecular polarizability can be used when the substrate 9 is made of synthetic resin.

Figure 2:
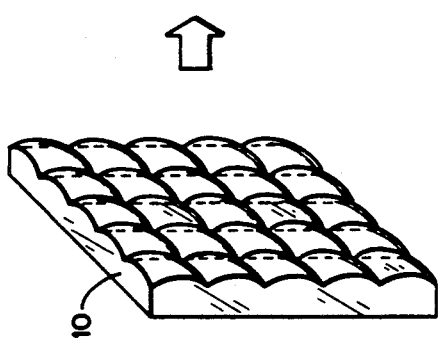
FIG. 2 is a perspective view showing a microlens array usable as a converging means for the present invention.

FIG. 2 shows another example of converging means in the form of a fly eye lens 10 which is made of a transparent substance, and has a number of convex facets. In this fly eye lens 10 each lens corresponds to picture element area.

Figure 3:
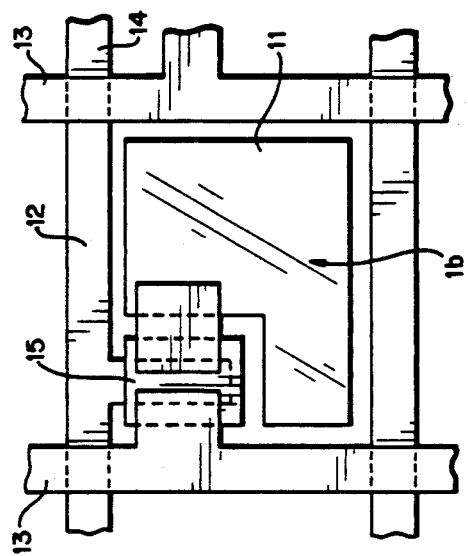

The microlens array 2 and the fly eye lens 10 are used in association with a display device shown in FIG. 3. This display device has a transparent electrode 11 forming a picture element area. The electrode 11 is switched on by a thin film transistor (TFT) 15 in response to electric signals from metallic conductors 12 and 13, thereby activating the liquid crystal adjacent to the transparent electrode 11 (i.e. the picture element area 1b).

Figure 4:
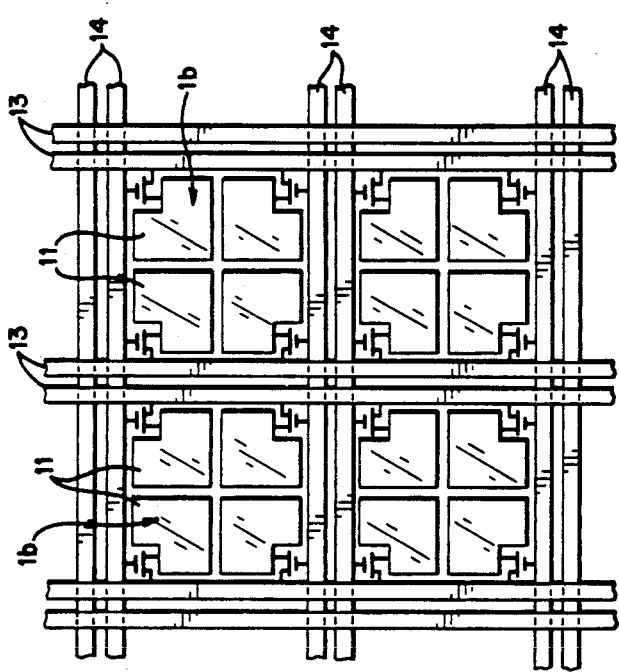
FIGS. 3 and 4 are respectively plan views showing a liquid crystal display device used in association with the microlens array.

FIG. 4 shows a further example in which each picture element 1b contains a plurality of electrodes 11. In this example the microlenses 8 and the lenses of the fly eye lens 10 (FIG. 2) can be disposed in each group of the electrodes 11.

Figure 5:
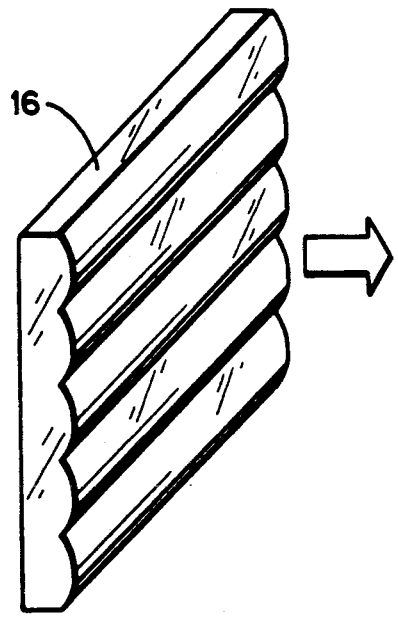
FIG. 5 is a perspective view showing a lenticular lens usable as a converging means for the present invention.
Figure 6:
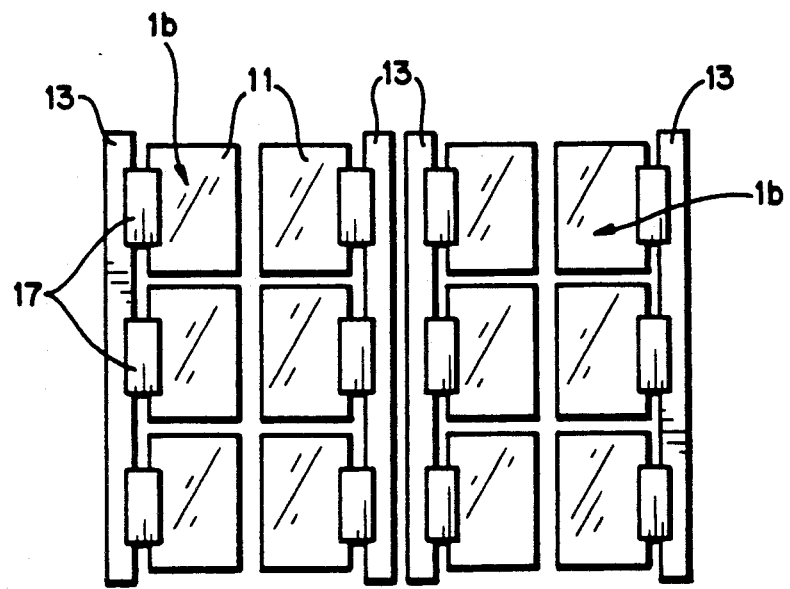
FIG. 6 is a schematic plan view showing a liquid crystal display device used in association with the lenticular lens of FIG. 5.

FIG. 5 shows a further example in which a lenticular lens 16 is used as a converging means. This lenticular lens 16 has convex facets on one side as shown in FIG. 5, arranged at the same pitch as those of picture elements or twice the pitch of them, and converges light in one direction only. The lenticular lens 16 can be used in association with the display device shown in FIG. 6. This display device is provided with electrodes 11 forming the picture element area 1b between the metallic conductors 13. The electrodes 11 are switched on through non-linear element. The lenses of the lenticular lens 16 are arranged for each picture element area 1b.

Experiments have demonstrated that when the microlens array 2 is used as shown in FIG. 1, the brightness of the display image was doubled.

Experiments have also demonstrated that when the radius of the projecting lens 6 is less than 20 mm, the brightness varied depending upon the radius, but when it is greater than 20 mm, the brightness was constant regardless of variations in radius.

The present invention is applicable under Köher's illumination, but it is also applicable under other illuminating systems such as critical illumination and telecentric system. The present invention is applicable not only to a single display panel system but also to a three panel system.

There is a difficulty in bonding the microlens array 2 to the liquid crystal element 1 because the adhesive unfavorably affects the optical characteristics thereof. In addition, the adhesive forms a layer thereby increasing the total thickness. The variations in thickness unfavorably affects the setting of the focal length of each component, and causes unnecessary reflection and diffusion.

Figure 7:
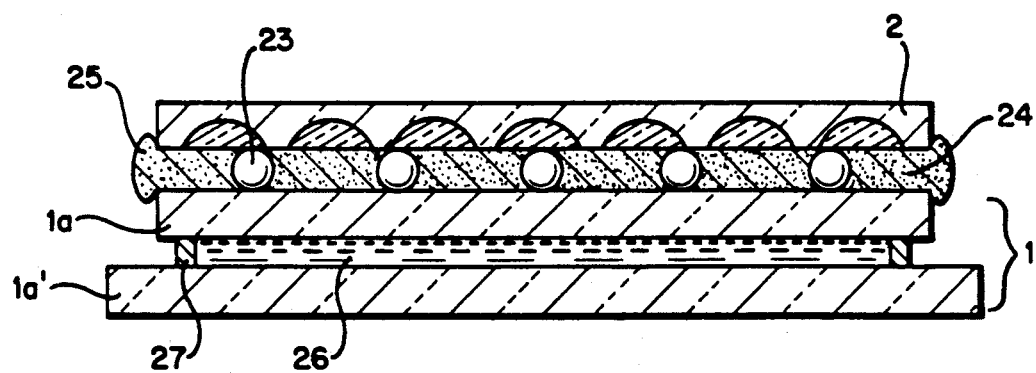
FIG. 7 is a cross-sectional view showing a composite layer of a display device and a microlens array.
Figure 8:
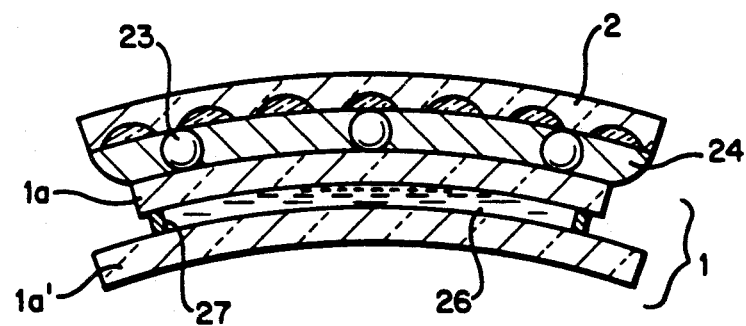
FIG. 8 is a cross-sectional view showing the composite layer of FIG. 7 when it is heated.

Referring to FIGS. 7 and 8, the liquid crystal panel or element 1 includes an inner layer 1a and an outer layer 1a', containing liquid crystal 26 sealed by a sealing material 27. An adhesive is selected from substances having a refractive index (1.4 to 1.6) approximate to that of glass of which the microlens array is made and a viscosity of 100 to 2000 cps. For example, photosensitive adhesive made of acrylic or epoxy resin (e.g. AVR-100 manufactured by Threebond Inc., UV-1003 manufactured by Sonychemical Inc., and NOA-61, 63, 65 manufactured by Norland Inc.). These adhesives tend to harden by exposure to ultraviolet rays, but instead of them, a thermosetting resin can be used. The adhesive is coated on the liquid crystal element 1 to a thickness of 10 to 100 μm. When the adhesive coat is thick, a more intensified lamp must be used so as to shorten the curing time. For example, when the coat is 100 μm thick, a high pressure mercury lamp of 250W at a height of 6 cm can be used without causing any problem, and the curing can be finished in 20 seconds.

The reference numeral 23 denotes spacers which are contained in the adhesive layer so as to maintain the even surface. The spacers are plastic balls having a diameter of 10 to 100 μm, and a refractive index of 1.4 to 1.6, and such elasticity as to be below that of the adhesive. Preferably, several pieces are added per 1 mm³. The reference numeral 25 denotes extruded portions of the adhesive layer whereby the bond between the liquid crystal panel 1 and the microlens array 2 is maintained.

FIG. 8 shows that the liquid crystal panel1 and the microlens array 2 are curved when they are heated but the spacers 23 and the adhesive layer 24 are likewise curved, thereby preventing the inner layer 1a and the microlens array 2 from becoming separated.

Experiments have demonstrated that the microlens array 2 of soda-lime glass and the inner layer 1a were bonded with the adhesive layer 24 of 100 μm. The transmissibility was tested at 400 to 700 nm. The loss caused by reflection was less than 0.1%, and no substantial scattering of light due to the presence of the spacers 23 was discerned. When no spacer was used, the inner layer 1a and the microlens array 2 were separated if the heating temperature is less than 100° C. In contrast, when spacers 3 of 30 μm were used, no separation occurred at a temperature of 150° C. In addition, the inner layer 1a and the microlens array unit withheld thermal shock tests between −25° C. and 80° C. (100 cycles).

The microlens array 2 can be made by the following methods:

(1) A molding method in which a metal mold is used to form a synthetic resin material or glass into a microlens array.

(2) A method in which convex lenses in a microlens array are formed by utilizing a phenomenon that when a specific type of photosensitive resin is exposed to light in a pattern corresponding to the microlens array, the non-reacted photosensitive resin moves from the non-exposed area to the exposed area and the exposed area swells up to form the convex lenses.

(3) A method in which convex lenses in a microlens array are formed by using a know photolithographic technique to pattern a thermoplastic resin in a plate shape corresponding to the microlens array and then heating the resin to a temperature above its softening point to give it flowability and cause semispherical surface by surface tension.

(4) A method in which convex lenses in a microlens array are formed by performing the proximity exposure on a photosensitive resin and distributing the amount of photoreacted material according to the indistinctness of the transfer image on the photosensitive resin at the edges of the mask used in the proximity exposure.

(5) A method in which a configuration equivalent to a microlens array is obtained by irradiating light with an intensity distribution on a photosensitive resin to form a refractive index distribution corresponding to the intensity of the light.

(6) A method in which a configuration equivalent to a microlens array is obtained by forming a refractive index distribution on glass or other transparent substrate using a selective ion exchange technique.

(7) A method in which convex lenses in a microlens array are formed by utilizing the contraction which accompanies crystallization when light is applied to a photosensitive glass.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A projection type image display apparatus comprising a source of light, a transmissive display device having a number of picture elements, a microlens array for converging rays of light in correspondence to one or more of the picture elements, a projecting lens disposed backward of the display device so as to project the image represented by the display device on a screen, the projection lens having a larger numerical aperture than that of the microlens array, wherein the microlens array is bonded to the display device with an adhesive.

2. A projection type image display apparatus as claimed in claim 1, wherein the adhesive is selected from substances having a refractive index approximately within the difference of 0.1 to that of a material of which the microlens array is made.

* * * * *